United States Patent [19]

Stahle et al.

[11] 4,148,770

[45] Apr. 10, 1979

[54] FURNITURE FABRIC AND COATING

[75] Inventors: Arno W. Stahle, Chamblee; Larry M. Bailey, Decatur, both of Ga.

[73] Assignee: Standard Oil Company (Indiana), Chicago, Ill.

[21] Appl. No.: 766,490

[22] Filed: Feb. 7, 1977

[51] Int. Cl.² ............... C08J 7/04; C08L 9/06; C08L 9/08; C08L 93/04
[52] U.S. Cl. ............... 260/27 BB; 260/29.6 ME; 428/260; 428/261; 428/265; 428/497; 428/517
[58] Field of Search ............... 260/27 BB, 29.6 ME; 428/260, 261, 265, 497, 517

[56] References Cited

U.S. PATENT DOCUMENTS

| | | | |
|---|---|---|---|
| 3,100,160 | 8/1963 | Korpman | 428/261 |
| 3,140,194 | 7/1964 | Gagliardi | 428/265 |
| 3,392,133 | 7/1968 | Stickelmeyer | 260/29.6 ME |
| 3,423,346 | 1/1969 | Klauss et al. | 260/29.6 ME |
| 3,625,752 | 12/1971 | Korpman | 260/27 BB |
| 3,657,175 | 4/1972 | Zimmerman | 260/29.6 ME |
| 3,900,691 | 8/1975 | Marrs et al. | 428/517 |

FOREIGN PATENT DOCUMENTS 1188792  4/1970  United Kingdom ............... 428/497

Primary Examiner—Ronald W. Griffin
Attorney, Agent, or Firm—Thomas J. Connelly; Arthur G. Gilkes; William T. McClain

[57] ABSTRACT

A coating which can be easily applied as an aqueous emulsion or dispersion to woven polypropylene and which provides dimensional stability and soft hand, while avoiding excessive tackiness and blocking comprises: about 100 parts by weight of styrene-butadiene rubber (SBR), wherein a styrene to butadiene ratio comprises 100 parts by weight of styrene to between about 66–180 parts by weight of butadiene, to between both about 10–100 parts by weight of wood rosin and about 1–18 parts by weight of an alkylaryl polyether alcohol having the formula:

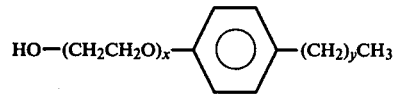

where: x is 12–20 and y is 8–10.

3 Claims, No Drawings

FURNITURE FABRIC AND COATING

BACKGROUND OF THE INVENTION

Woven slit films of polypropylene with deniers of between about 300–1500 in the warp and weft and with a tensile strength (ASTM D-1682 (Instron)) in pounds in the warp direction of at least 70 and in the weft or fill direction of at least 40 are useful as foundation coverings on the framework of wooden furniture in areas such as back, seat, and sides, etc. This foundation covering is not part of the visible upholstery.

Unfortunately, unmodified woven slit films of polypropylene when cold cut and/or stapled readily ravel. In order for such wovens to be useful they must have a dimensional stability of at least 3 pounds to satisfactorily overcome this tendency to ravel. Dimensional stability for purposes of this Specification and Claims is the force in pounds required to remove 10 ends from a 4 inch wide sample using a 1 inch wide bar containing five pins mounted in the lower jaw of an Instron. The direction as to warp or weft is the direction in which the force is applied.

One method for stabilizing woven polypropylene fabric is to apply an adhesive coating of some kind. However, most adhesive coatings will either lack sufficient adhesion, or introduce undesirable stiffness to the coated fabric, or introduce a tackiness and/or tendency to block to the degree that such fabrics are not useful as foundation coverings. In addition to these concerns relating to the properties of the finished fabric, ease of processing is also very important.

BRIEF DESCRIPTION OF THE INVENTION

It is an object of this invention to provide a coating composition for woven slit films of polypropylene that dimensionally stabilize such wovens to satisfactorily overcome ravelling which generally occurs upon cold cutting or stapling while not introducing undesirable stiffness or a tendency to block when stored in a roll. It is an object of this invention to provide a coating which can be readily applied without significant processing difficulties in a dip and nip coating process.

It has been found that an aqueous SBR emulsion containing a wood rosin functioning as a tackifier and an alkylaryl polyether alcohol function both to counteract the tackiness introduced by the wood rosin and to lessen processing problems can be formulated to achieve the above cited objects of this invention. It is to be noted that the processing problems involve the tendency of the emulsion to adhere to and build-up on the nip rolls during a dip and nip coating process.

It is to be noted that in general those materials in a coating which reduce blocking tend also to reduce adhesion. This invention balances blocking on the one hand and adhesion on the other in coatings for woven slit films of polypropylene.

DETAILED DESCRIPTION OF THE INVENTION

Generally, the coating of this invention comprises: about 100 parts by weight of styrene-butadiene rubber (SBR), wherein a styrene to butadiene ratio comprises 100 parts by weight of styrene to between about 66–180 parts by weight of butadiene, about 10–100 parts by weight of wood rosin comprising abietic acid and a sufficient part by weight of an alkylaryl polyether alcohol having the formula:

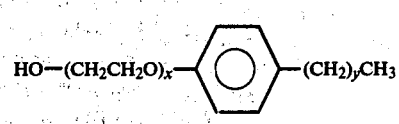

where: x is 12–20 and y is 8–10, to both aid processing and overcome blocking problems while still providing a dimensional stability of at least 3 pounds in both the warp and weft direction to satisfactorily prevent ravelling upon stapling or cold cutting. Said sufficient part by weight is in the range of between about 1–18, and preferably between about 4–8.

In general, the higher the parts by weight of the wood rosin based upon a 100 parts by weight of styrene-butadiene rubber, the higher must be the parts by weight of the alkylaryl polyether alcohol to avoid blocking and processing problems. All other factors held fixed as the parts by weight of alkylaryl polyether alcohol becomes less than 4, the coating becomes tackier and increasingly has a tendency to block as measured according to the following procedure: A $2''\times 4''$ sample is folded and pressed together for 4 hours at 120° F. by means of a $2''\times 2''$ metal weight which applies a pressure of 1 lb./sq. inch. The force in pounds required by an Instron to separate the folded ends of the sample is a measure of the blocking tendency. To achieve a blocking tendency of at most 3/10 of a pound, the approximate cut-off point for useful foundation coverings in roll form, at least about 1 part by weight of alkylaryl polyether alcohol is usually required. On the other hand, as the parts by weight of said alkylaryl polyether alcohol increases above 8, the adhesion decreases to a generally undesirable degree at about 18 parts by weight and also it is to be noted that the tendency of said alkylaryl polyether alcohol to plasticize the SBR also causes the coating to become undesirably tacky or gummy.

The formulation of an emulsion comprising styrene-butadiene and wood rosin derivatives such as for examples ones having the trade name Dresinol ® sold as an emulsion by Hercules is well known. The introduction of wood rosin in the quantities required by this invention are within the skill of the relevant art. The wood rosin of this invention comprises mostly abietic acid either neutralized or in the form of an ionic salt.

An extractable solids coating level of 2%–8% by weight as based upon the weight of the fabric, applied from an aqueous dispersion of the coating of this invention in a dip and nip process, has been found to work well both as to processing and as to a finished article made therewith. Woven slit films of polypropylene useful as foundation coverings of furniture fabrics have an ounces/yard$^2$ in the range of about 2–8.

EXAMPLE

To 1518 parts by weight of water, add in the following order with stirring 4 parts by weight of T-Det-N-14 sold by Thompson-Hayward, 361.5 parts by weight of Pliolite LPF-2914-A (39% solids) sold by Goodyear, and 120 parts by weight of Dresinol ® 205 (45% solids) sold by Hercules.

The above coating composition was applied by means of a dip and nip process to two woven slit films of polypropylene sold by Amoco Fabrics Company, Patchogue-Plymouth, Division, Georgia. The first fabric was Style F-2410 having a count (ASTM D-3334.8) of $24\times 10$, a tensile strength in pounds (ASTM D-1682) of 135 in the warp and 85 in the weft, and a dimensional stability (as defined herein before) of about 93 pounds in the warp and about 7.7 pounds in the weft and a weight in oz./yd.$^2$ (ASTM D-1910) of 3.1. The second fabric was Style F-2407 having a count of 24×7, a tensile strength in pounds of 130 in the warp and 70 in the weft, a weight in oz./yd.$^2$ of 2.7, and a dimensional stability of about 79 pounds in the warp and 0.8 of a pound in the weft.

The dip and nip process involved passing the fabric to be coated through a dip tank containing the above coating then through a nip of two rolls each having a diameter of 14 inches under a pressure at the nip of 60 pounds at a rate of 45 feet/minute, and finally subjecting the coated fabric to a temperature of about 300° F. for about 2 minutes.

On F-2407, an extractable coating weight of 3.9% provided a dimensional stability of 72 pounds in the warp and 3.6 pounds in the weft, with a tendency to block of less than 3/10 of a pound.

On F-2410, an extractable coating weight of 5.1% provided a dimensional stability of 84 pounds in the warp and 11 pounds in the weft, with a tendency to block of less than 3/10 of a pound.

The weight of extractable coating was obtained as follows: (1) a sample of approximately 2"×2" was weighed accurately, (2) the sample was then agitated in a solvent of 1,1,1-trichlorethane at 40° C. for 15 minutes and then the solvent was replaced with fresh solvent and then agitated in the same manner for 15 minutes more, and finally (3) the sample was reweighed and the percent by weight of the coating extracted determined, i.e., the percentage by weight of the coated fabric that is extractable coating. The length of agitation can be extended so as to ensure based upon a visual inspection that substantially all of the coating has been removed.

In place of the T-Det-N-14, a variety of other chemically similar alkylaryl polyether alcohols were successfully used, such as T-Det-N-15 and CO 630 sold by GAF.

This example and specific embodiments of this invention are intended to be illustrative only. Variations on these are apparent to one skilled in the art and are intended to be within the scope of this invention.

The invention which is claimed is:

1. A coating comprising: about 100 parts by weight of styrene-butadiene rubber, about 10–100 parts by weight of wood rosin comprising abietic acid, and sufficient parts by weight of an alkylaryl polyether alcohol to both aid processing and overcome blocking problems while still allowing sufficient adhesion to provide a dimensional stability of at least 3 pounds; wherein said styrene-butadiene rubber has a styrene to butadiene ratio of about 100 parts by weight of styrene to between about 66–180 parts by weight of butadiene and wherein said alkylaryl polyether alcohol has a formula:

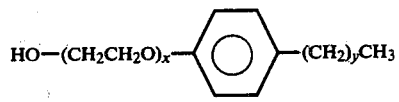

wherein x is 12–20 and y is 8–10.

2. The composition of claim 1, wherein said sufficient parts by weight is in the range of between about 1–18 parts by weight.

3. A woven polypropylene fabric coated with the coating of claim 1.

* * * * *